Patented Jan. 19, 1954

2,666,746

UNITED STATES PATENT OFFICE 2,666,746

LUBRICATING OIL COMPOSITION

John C. Munday, Cranford, and Dilworth T. Rogers, Summit, N. J., assignors to Standard Oil Development Company, a corporation of Delaware No Drawing. Application August 11, 1952, Serial No. 303,827

8 Claims. (Cl. 252—56)

This invention relates to novel chemical products and to processes of preparing and using same. More particularly, it relates to high molecular weight copolymers of two different types of esters, one being an ester of the dibasic fumaric acid and the other being a vinyl ester. These novel copolymers are especially useful for improving the pour point, viscosity index and other properties of oils such as mineral lubricating oils, or other products into which they are incorporated.

It has heretofore been suggested to make lubricating oil additives by polymerization of several different types of unsaturated esters, and some copolymers have been suggested. However, many types of copolymers are for one reason or other unsatisfactory; for instance, some are insoluble in lubricating oils, especially highly paraffinic oils, and some are soluble but are inferior as pour depressants and viscosity index improvers.

Broadly, the present invention comprises the production of copolymers of a fumaric acid ester of one or more saturated alcohols having about 8 to 18 carbon atoms, with a vinyl ester of a fatty acid.

The alcohol of the fumarate ester may be a single individual alcohol, especially one such as the $C_{10}$ (decyl) or $C_{12}$ (lauryl) or $C_{14}$ (tetradecyl) alcohol. A mixture of two or more alcohols having an average number of carbon atoms ranging from about 8 to 18 and preferably averaging about 10 to 14 carbon atoms may also be employed in the fumarate ester. One very suitable commercially available mixed alcohol is a product obtained by hydrogenation of coconut oil. Such a product is sold under the trade name "Lorol," and it is a mixture of saturated straight chained alcohols or alkanols ranging from about 10 to 18 carbon atoms, but having a major proportion of lauryl alcohol which has 12 carbon atoms. Other related products are made by separating this material, which may be considered as a crude mixture, into several different fractions having a relatively higher proportion of either the higher or lower or medium constituents thereof. The composition of the "Lorol" per se and other related products called "Lorol B" and "Lorol R," is approximately as follows:

Composition of mixtures of commercial alcohols

| Component | Trade name | | |
|---|---|---|---|
| | Lorol | Lorol B | Lorol R |
| $C_{10}$ alcohol _____ weight percent __ | 4.0 | 3.0 | 1.0 |
| $C_{12}$ alcohol _____ do __ | 55.5 | 46.0 | 85.0 |
| $C_{14}$ alcohol _____ do __ | 22.5 | 24.0 | 13.0 |
| $C_{16}$ alcohol _____ do __ | 14.0 | 10.0 | |
| $C_{18}$ alcohol _____ do __ | 4.0 | 17.0 | 1.0 |
| Average number of carbon atoms | 12.8 | 13.5 | 12.3 |

Other alcohols may be used such as octyl, decyl, cetyl, octadecyl, as well as other mixtures such as a mixture of octyl or decyl with cetyl or octadecyl, and a mixture of $C_8$, $C_{10}$, $C_{12}$, $C_{14}$, $C_{16}$ and $C_{18}$ alcohols having an average in the $C_{11}$–$C_{14}$ range. Even some of the alcohols having less than 8 carbon atoms, e. g., hexyl, amyl, or even lower may be used, providing that a sufficient amount of higher alcohols having for instance 12 to 18 carbon atoms, are also used to make a total mixed alcohol product averaging at least as high as 8 carbon atoms and preferably averaging about 10 to 14 carbon atoms. When the alcohols in the fumarate ester average above about $C_{12}$, for example about $C_{13.5}$ as in Lorol B, the copolymers are pour depressants as well as V. I. improvers. Shorter alcohols, for example decyl and octyl in the fumarate ester give fumarate-vinyl copolymers which are exceptional V. I. improvers, but have little or no pour depressant action.

In preparing the fumaric acid ester which may also be called an alkyl fumarate, direct esterification of fumaric acid with an alcohol is preferred. However, ester interchange between a lower alkyl fumarate such as methyl or ethyl or amyl fumarate and a higher alcohol of the desired type, e. g., one having 8 to 18 carbon atoms or so, or Lorol B, may also be employed. The ester interchange may be carried substantially to completion, or only partly so. In the latter case the product will contain mixed esters such as methyl Lorol B fumarate.

The other primary reactant to be copolymerized with the above described alkyl fumarate esters, is the vinyl ester of a lower fatty acid, preferably having less than 20 carbon atoms. Vinyl acetate is the preferred vinyl ester, although one may also use vinyl esters of other acids such as propionic, butyric, lauric, myristic, palmitic, etc., such as the vinyl ester of cocoanut oil acids.

The proportions in which these two reactants, namely the alkyl fumarate and the vinyl ester, are copolymerized may be varied over a fairly wide range. For example, the mol ratio of alkyl fumarate to vinyl ester may be in the range from 1/0.2 to 1/6, preferably about 1/0.5 to 1/5, which generally corresponds to a weight ratio in the range from 20/1 to 1/1. The proportions employed depend somewhat on the particular fumarate and vinyl esters which are copolymerized. For example, octyl fumarate-vinyl acetate copolymers of 15,000–20,000 molecular weight may be insoluble in some oils if more than about one mol of vinyl acetate per mol of fumarate is employed, whereas with 0.6 or 0.8 mol of vinyl acetate this difficulty is not encountered. With higher fumarates greater amounts of vinyl acetate can be employed, for example 2 or 3 mols per mol of decyl fumarate, or 5 or 6 or more mols per mol of octadecyl fumarate. A similar situation exists with respect to the vinyl ester, in that greater amounts of vinyl esters such as vinyl butyrate and vinyl laurate can be employed than of vinyl esters of short chain acids, for example vinyl acetate.

In carrying out the copolymerization the two reactants may be mixed and the mixture heated with or without a solvent or diluent, and preferably with a small amount of catalyst, to a reaction temperature of about 50 to 125° C., preferably about 60 to 100° C., using, if necessary, either superatmospheric pressure or refluxing, to prevent loss of reactants by vaporization. Adequate cooling should be provided to absorb the heat of polymerization. It is often convenient, especially when employing large proportions of vinyl ester, to add the latter gradually rather than all at once, thus controlling polymerization rate. As catalyst, it is found suitable to use about 0.1 to 5.0%, for example 1.0% by weight of a peroxide such as benzoyl peroxide, acetyl peroxide, t-butyl hydroperoxide, t-butyl perbenzoate, etc.

The reaction time will vary for instance from about 1 to 100 hours, preferably about 5 to 20 hours, varying inversely with the temperature. The molecular weight should be from about 1,000 to 50,000 or more, but preferably from about 3,000 to 30,000 for best results from a pour depressing point of view. When employed as viscosity index improvers, copolymer molecular weights from about 8,000 to 20,000 are preferred. The molecular weight may be controlled by the use of a solvent or diluent, such as n-heptane or other inert liquid such as petroleum ether, refined naphtha, kerosene, lubricating oil, etc., copolymers of higher molecular weights being obtained with lesser amounts of solvent or none at all.

During the copolymerization it is preferred to exclude oxygen or air by any suitable means such as by blowing the reaction mixture or the reaction vessel with an inert gas such as nitrogen or carbon dioxide.

The copolymers of this invention may be used as lubricating oil additives, in concentrations ranging for instance from about .05% to 5% or more. Preferably from about 0.1% to 0.5% is used when pour depressing is the primary object, and a larger concentration for example from 0.5% to 10% when V. I. improvement is the primary object. The oil basestock in which the copolymers may be used may be not only the paraffinic oils which require pour depressors, but also naphthenic or mixed base lubricating oils which are desired to be improved in viscosity index, or blends of various types of oils where substantial improvements in both pour depressing and V. I. improvement are desired. The copolymers may also be used in greases which contain metal soaps, or in paraffin wax or waxy compositions, or in lighter liquid hydrocarbon oil products such as diesel fuel basestocks, which are often highly paraffinic in nature and require pour depressing, or other light oils such as domestic heating oil basestocks, mineral seal oil, refined kerosene and the like.

In preparing the lubricating oil or other compositions containing the novel copolymers of this invention, one may also add other conventional additives such as dyes, anti-oxidants, etc., or one may add other types of pour depressors such as the wax-naphthalene condensation product previously referred to or others such as a wax-phenol condensation product, as well as other viscosity index improvers such as polybutene, polyacrylates, e. g. poly lauryl methacrylate, polyvinyl ethers, polyvinyl esters, etc.

The invention will be better understood from a consideration of the following examples.

EXAMPLE I

"Lorol B" fumarate was made by direct esterification of fumaric acid with "Lorol B," the mixed alcohol product previously described, and the resulting "Lorol B" fumarate was copolymerized with vinyl acetate in the presence of a small amount of n-heptane as solvent and using a small amount of benzoyl peroxide as catalyst, the exact amounts of materials used being as follows:

650 g. Lorol B fumarate (1.31 mols)
113 g. vinyl acetate (1.31 mols)
85 cc. n-heptane
7.63 g. 60 mesh benzoyl peroxide The above charge was stirred for 17 hours 10 minutes at 70° C. under a nitrogen atmosphere, n-heptane and unreacted vinyl acetate were removed by evaporation at 80° C. under a vacuum. The resulting copolymer product, which was water-white and highly viscous, had a molecular weight of about 7,100 (by the Staudinger method, using 5 mg. of the polymer per cc. of di-isobutylene). It was a viscosity index improver and a pour depressant of exceptional potency and stability in a variety of basestocks of different types, as shown by the data in Table I.

Table I.—Pour point depression by Lorol B fumarate-vinyl acetate copolymer

| Weight percent copolymer | ASTM pour point (° F.) | | |
|---|---|---|---|
| | Oil A | Oil B | Oil C |
| 0 | 5 | 20 | 30 |
| 0.1 | −20 | −25 | −20 |
| 0.2 | −20 | −25 | <−35 |
| 1.2 | −15 | | |
| 1.8 | −10 | | |
| 2.4 | −5 | | |

It is apparent from the data in Table I that the Lorol B fumarate-vinyl ester copolymer of this invention is a surprisingly effective pour depressor, and has good potency in paraffinic oil basestocks having various ASTM pour points per se, ranging from 5 to 30° F. Small amounts, e. g. 0.1% and 0.2% or more, lower the pour point of these various oils down to the vicinity of −20° F. to below −35° F.

For comparison with the Lorol B fumarate-vinyl acetate copolymer, a polymer of "Lorol B" fumarate alone was blended in 0.2% concentration in the same three oil basestocks A, B and C. The ASTM pour point was −15° F. in each case, whereas applicants' copolymer gave −20, −25 and below −35° F. respectively.

Another unobvious advantage of the present invention is that the copolymers produced not only are good pour depressors when tested by the ASTM pour point procedure but also have good pour stability as determined by a laboratory test intended to simulate field storage conditions in which the blends being tested are subjected to alternate cycles of cooling and warming. In this pour stability test a blend of 0.2% of the "Lorol B" fumarate-vinyl acetate copolymer described above, in Oil C basestock, showed a stable pour point below −10° F., whereas a similar concentration of a commercially available pour depressor of the wax-naphthalene condensation product type, went solid at 20° F. in the same pour stability test.

Various concentrations of the 7,100 molecular weight copolymer described above, and also of a 19,600 molecular weight copolymer prepared similarly were tested in Oil A basestock for viscosity index improvement, with the results shown in Table II.

Table II.—Viscosity index improvement by Lorol B fumarate-vinyl acetate copolymers

| Weight percent copolymer | Copolymer molecular weight | Viscosity index |
|---|---|---|
| 0 | | 114 |
| 1.2 | 7,100 | 125 |
| 1.8 | 7,100 | 128 |
| 2.4 | 7,100 | 131 |
| 1.2 | 19,600 | 137 |
| 1.8 | 19,600 | 141 |
| 2.4 | 19,600 | 143 |

The data in the Table II indicate that the viscosity index of a paraffinic lubricating oil basestock can easily be raised from 114 to 130 or 140 or even higher by the addition of small amounts of fumarate-vinyl ester copolymers.

EXAMPLE II

Octyl fumarate and vinyl acetate were copolymerized at 68° C. in the presence of 1.0 weight per cent of benzoyl peroxide catalyst. The fumarate/vinyl mol ratio employed was 1/0.8. The monomers were diluted to 77.5 volume per cent concentration by petroleum naphtha, the atmosphere was nitrogen, and the time of reaction was 16 hours. The product was dissolved in benzene and methanol was added to precipitate the copolymer free of monomers. After drying in a vacuum oven, the molecular weight was found to be 11,000. The copolymer was not a pour depressant. However, it was a V. I. improver of exceptional characteristics, giving high viscosity indices with relatively little increase in viscosity. Another copolymer prepared similarly but employing a fumarate/vinyl mol ratio of 1/1, had a molecular weight of 14,000. Blends of the two copolymers in Oil A had the viscosities and viscosity indices shown in Table III.

Table III.—Viscosity index improvement by octyl fumarate-vinyl acetate copolymers

| Weight percent copolymer | Molecular weight | Viscosity (Saybolt seconds) | | | Viscosity index |
|---|---|---|---|---|---|
| | | 15° F. | 100° F. | 210° F. | |
| 0 | | | | 46.0 | 114 |
| 1.2 | 11,000 | 3,437 | 196.5 | 49.5 | 132 |
| 1.8 | 11,000 | 3,460 | 290.0 | 51.7 | 138 |
| 2.4 | 11,000 | 3,591 | 219.9 | 53.4 | 141 |
| 1.2 | 14,000 | 3,446 | 197.4 | 49.5 | 132 |
| 1.8 | 14,000 | 3,465 | 213.5 | 52.8 | 141 |
| 2.4 | 14,000 | 3,528 | 226.8 | 55.1 | 144 |

EXAMPLE III

Decyl fumarate and vinyl acetate were copolymerized at 70° C., employing 1.0 weight per cent benzoyl peroxide catalyst, nitrogen atmosphere, 16 hour reaction time, 72.5 volume per cent monomer concentration in n-heptane diluent, and a fumarate/vinyl mol ratio of 1/1. The molecular weight of the copolymer, after precipitating and drying as in Example II, was 16,800. A blend of 1.8 weight per cent of the copolymer in Oil A had a viscosity at 210° F. of 56.7 (Saybolt) and a viscosity index of 140.

The effect of increasing the proportion of vinyl ester was determined by employing two mols of vinyl acetate per mol of decyl fumarate. In this case a blend of 1.8 weight per cent of copolymer in Oil A had a viscosity at 210° F. of only 54.3 and a viscosity index of 140. The advantage of employing the larger portion of vinyl acetate is apparent, since less thickening of the base oil occurred when the copolymer was prepared with two mols of vinyl acetate. This trend has also been observed in the case of other fumarate-vinyl ester copolymers, for example, those of Lorol fumarate and vinyl acetate prepared in 1/2 fumarate/vinyl acetate mol ratio.

EXAMPLE IV

To investigate the effect of increasing the chain length of the vinyl ester component of the copolymers of invention, additional copolymers of the "Lorol B" ester of fumaric acid were prepared with vinyl acetate, vinyl butyrate, and vinyl laurate, that is, using vinyl esters of fatty acids containing 2, 4 and 12 carbon atoms, respectively. The copolymers were prepared using equal mols of the fumarate ester and the vinyl ester, using n-heptane as a diluent (a 4:1 ratio of monomers to heptane by weight), using as a catalyst 1.0 weight per cent of benzoyl peroxide, a temperature of 75° C., and a reaction time of 18 hours. The resulting copolymers were separated from unreacted vinyl ester and diluent as in Example I above.

The copolymeric additives prepared as described above were blended in 0.1 and 0.2 weight per cent in both Oil A' and Oil C as in Table I above. Oil A' was identical with Oil A above except that it was less stringently de-waxed and had a pour point of 15° F. instead of 5° F. as in Table I. Results of the standard ASTM pour point determinations are set out in Table IV below:

Table IV

| Vinyl ester used | ASTM pour points (° F.) | | | | | |
|---|---|---|---|---|---|---|
| | Oil A' | | | Oil C | | |
| | 0.0 | 0.1 | 0.2 | 0.0 | 0.1 | 0.2 |
| Vinyl acetate | +15 | −20 | −20 | +30 | −15 | −25 |
| Vinyl butyrate | +15 | −15 | −25 | +30 | −25 | −25 |
| Vinyl laurate | +15 | −15 | −15 | +30 | −15 | −15 |

It is not intended that this invention be limited to the specific materials which have been mentioned merely for the sake of illustration but only by the appended claims in which it is intended to claim all novelty inherent in the invention as well as all modifications coming within the scope and spirit of the invention.

This application is a continuation-in-part of Serial No. 653,177, filed March 8, 1946, for the same inventors, now abandoned.

What is claimed is:

1. A lubricating oil composition comprising a major proportion of mineral oil and a small amount, sufficient to depress the pour point thereof, of an oil-soluble copolymer of a vinyl ester of a fatty acid having from 2 to 18 carbon atoms and a dialkyl fumarate wherein each alkyl group ranges from not less than 10 to not more than 18 carbon atoms.

2. A lubricating oil composition comprising a major proportion of mineral oil and a small amount, sufficient to depress the pour point thereof, of an oil-soluble copolymer of vinyl acetate and a dialkyl fumarate, wherein each alkyl group ranges from not less than 10 to not more than 18 carbon atoms.

3. A lubricating oil composition comprising a major proportion of mineral oil and a small amount, sufficient to depress the pour point thereof, of an oil-soluble copolymer of a vinyl butyrate and a dialkyl fumarate wherein each alkyl group ranges from not less than 10 to not more than 18 carbon atoms.

4. A lubricating oil composition comprising a major proportion of mineral oil and a small amount, sufficient to depress the pour point thereof, of an oil-soluble copolymer of vinyl laurate and a dialkyl fumarate wherein each alkyl group ranges from not less than 10 to not more than 18 carbon atoms.

5. A lubricating composition which comprises a major proportion of a waxy mineral oil base stock having combined therein from 0.01% to 5.0% by weight of a copolymer of about 1 mol of a dialkyl fumarate of alcohols averaging about 10 to 14 carbon atoms with about 0.2 to 6.0 mols of vinyl acetate, said lubricating composition having an improved pour point.

6. A lubricating composition comprising a major amount of a waxy mineral oil base stock having combined therein about .01% to 5.0% by weight of a copolymer having a molecular weight of from about 1,000 to about 50,000, said copolymer being formed from about 1 mol of a dialkyl fumarate of alcohols having from 10 to 14 carbon atoms and about 0.8 to about 2.0 mols of vinyl acetate.

7. A lubricating oil composition having improved pour point characteristics which comprises a major amount of a waxy mineral oil base stock and from 0.01 to 5.0% by weight of a copolymer having a molecular weight of about 5,000 to 20,000, said copolymer being formed from substantially equimolar proportions of vinyl acetate and a di-alkyl fumarate of the mixed alcohols obtained upon hydrogenation of cocoanut oil, said mixture of alcohols having an average number of carbon atoms in the order of 13.5.

8. A lubricating oil composition comprising a major proportion of mineral oil containing combined therein from 0.01% to 10.0% by weight of an oil soluble co-polymer of a vinyl ester of a fatty acid having from 2 to 18 carbon atoms, and a dialkyl fumarate wherein each alkyl group ranges from not less than 8 to not more than 18 carbon atoms.

JOHN C. MUNDAY.
DILWORTH T. ROGERS.

References Cited in the file of this patent
UNITED STATES PATENTS

| Number | Name | Date |
|---|---|---|
| 2,327,705 | Frolich | Aug. 25, 1942 |
| 2,366,517 | Gleason | Jan. 2, 1945 |
| 2,570,788 | Grammaria | Oct. 9, 1951 |
| 2,628,198 | Arundale et al. | Feb. 10, 1953 |